(12) United States Patent
Johansson et al.

(10) Patent No.: US 10,978,864 B2
(45) Date of Patent: Apr. 13, 2021

(54) CIRCUIT FOR BREAKING ALTERNATING CURRENT

(71) Applicant: Blixt Tech AB, Stockholm (SE)

(72) Inventors: Jan Johansson, Solna (SE); Henrik Borg, Norsborg (SE)

(73) Assignee: Blixt Tech AB, Stockholm (SE)

( * ) Notice: Subject to any disclaimer, the term of this patent is extended or adjusted under 35 U.S.C. 154(b) by 343 days.

(21) Appl. No.: 16/067,429

(22) PCT Filed: Jan. 19, 2017

(86) PCT No.: PCT/SE2017/050046
§ 371 (c)(1),
(2) Date: Jun. 29, 2018

(87) PCT Pub. No.: WO2017/127012
PCT Pub. Date: Jul. 27, 2017

(65) Prior Publication Data
US 2019/0044318 A1 Feb. 7, 2019

(30) Foreign Application Priority Data
Jan. 19, 2016 (SE) .................................. 1650057-1

(51) Int. Cl.
*H02H 3/02* (2006.01)
*H02H 3/08* (2006.01)
(Continued)

(52) U.S. Cl.
CPC .............. *H02H 3/021* (2013.01); *H02H 3/08* (2013.01); *H02H 3/20* (2013.01); *H02H 3/385* (2013.01); *H02H 1/0007* (2013.01); *H02H 3/025* (2013.01)

(58) Field of Classification Search
CPC ............ H02H 3/021; H02H 3/08; H02H 3/20; H02H 3/385; H02H 1/007; H02H 3/025
(Continued)

(56) References Cited

U.S. PATENT DOCUMENTS 4,429,339 A * 1/1984 Jaeschke ............ H03K 17/0822
330/207 P
5,650,901 A * 7/1997 Yamamoto ............. H01H 9/542
361/100
(Continued)

FOREIGN PATENT DOCUMENTS

CN 101442303 A 5/2009

*Primary Examiner* — Thienvu V Tran
*Assistant Examiner* — Bart Iliya
(74) *Attorney, Agent, or Firm* — Blank Rome LLP

(57) ABSTRACT

The present invention relates to a circuit and an arrangement for breaking alternating current, the circuit comprising: an input arranged to receive an alternating current (AC); an output arranged to provide the alternating current (AC) to at least one electrical load; at least one controllable switch coupled between the input and the output; an impedance network (Z) coupled between the input and the output; and a transistor network (TN) comprising at least one transistor ($T_{TN1}$; $T_{TN2}$), the transistor network (TN) being arranged to control the at least one controllable switch, so as to control the breaking of the alternating current (AC) provided to the at least one electrical load, based on a value of at least one voltage (V1; V2) of at least one node of the impedance network (Z).

22 Claims, 14 Drawing Sheets

(51) Int. Cl.
*H02H 1/00* (2006.01)
*H02H 3/38* (2006.01)
*H02H 3/20* (2006.01)

(58) Field of Classification Search
USPC .......................................................... 361/86
See application file for complete search history.

(56) References Cited

U.S. PATENT DOCUMENTS

| | | |
|---|---|---|
| 9,007,186 B1 | 4/2015 | Krummey et al. |
| 2003/0160517 A1 | 8/2003 | Lo et al. |
| 2004/0222701 A1 | 11/2004 | Kugelman |
| 2006/0238936 A1 | 10/2006 | Blanchard et al. |
| 2009/0201617 A1* | 8/2009 | Yamaguchi .............. H01H 9/40 |
| | | 361/93.9 |
| 2010/0208396 A1* | 8/2010 | Lee ........................ H01H 83/02 |
| | | 361/42 |
| 2011/0121752 A1 | 5/2011 | Newman, Jr. |
| 2011/0148202 A1 | 6/2011 | Rada et al. |
| 2011/0309816 A1 | 12/2011 | Simon et al. |
| 2014/0009189 A1 | 1/2014 | Mauder et al. |
| 2015/0002977 A1* | 1/2015 | Dupraz .................. H01H 9/542 |
| | | 361/115 |
| 2015/0108966 A1 | 4/2015 | Kadonoff |

\* cited by examiner

CIRCUIT FOR BREAKING ALTERNATING CURRENT

TECHNICAL FIELD

The present invention relates to a circuit for breaking alternating current and to an arrangement for breaking alternating current.

BACKGROUND

Circuits for breaking alternating current (AC) are known in the art.

One known solution is the well-known fuse, which breaks the current if an applied current is larger than a nominal value, i.e. an overcurrent. The applied current is broken as a metal wire or strip of the fuse melts due to the overcurrent.

Another solution known in the art is a circuit breaker which is arranged to protect electrical circuits, including electrical loads, from damage caused by overcurrent. Unlike the fuse solution, the known circuit breaker may be reset manually or automatically to resume normal operation.

A problem of the known solutions is that they relatively slowly break the alternating current (AC), i.e. the breaking of the current takes a relatively long time, which may damage the electrical loads and/or the breaking circuit itself.

SUMMARY

An objective of embodiments of the present invention is to provide a solution which at least partly mitigates or solves the drawbacks and problems of the known solutions.

The above and further objectives are achieved by the subject matter of the independent claim. Further advantageous implementation forms of the present invention are defined by the dependent claims and other embodiments.

According to a first aspect of the invention, the above mentioned and other objectives are achieved with a circuit for breaking alternating current, the circuit comprising:
an input arranged to receive an alternating current (AC);
an output arranged to provide the alternating current (AC) to at least one electrical load;
at least one controllable switch coupled between the input and the output;
an impedance network (Z) coupled between the input and the output; and
a transistor network (TN) comprising at least one transistor ($T_{TN1}$; $T_{TN2}$), the transistor network (TN) being arranged to control the at least one controllable switch, so as to control the breaking of the alternating current (AC) provided to the at least one electrical load, based on a value of at least one voltage (V1; V2) of at least one node of the impedance network (Z).

Thus, the at least one controllable switch and the impedance network (Z) are coupled in series between the input and the output. The control of the at least one controllable switch is provided by the at least one transistor $T_{TN1}$; $T_{TN2}$. Therefore, the switching, and thus also the breaking of the alternating current, may be effected very quickly. Thereby, the risk for damages of the loads provided with the alternating current and/or of the circuit itself due to overcurrent is very low. For example, the control of the least one controllable switch being provided by the transistor network (TN) may result in a much quicker switching, e.g. a 100-1000 times faster switching, than a control provided by a controller circuit comprising a processor.

According to an embodiment of the above mentioned first aspect, the impedance network (Z) is coupled according to one in the group of:
between the input and the at least one controllable switch; and
between the at least one controllable switch and the output.

Since the impedance network may be coupled in a number of ways in the circuit, the design of the circuit has a number of degrees of freedom.

According to an embodiment of the above mentioned first aspect, the circuit comprises a first controllable switch and a second controllable switch coupled in series with each other and being arranged between the input and the output.

When the first and second controllable switches are included in the circuit, it may be possible to block the alternating currents in both directions.

According to an embodiment of the above mentioned first aspect, the impedance network (Z) is coupled between the first controllable switch and the second controllable switch.

By also having the possibility to couple the impedance network between the first controllable switch and the second controllable switch, further constructional advantages are provided regarding the degrees of freedom for the circuit design.

According to an embodiment of the above mentioned first aspect, the first controllable switch and the second controllable switch are coupled in opposite directions between the input and the output.

When the first and second controllable switches are included in the circuit, and are coupled in opposite directions, the alternating current may be blocked in both directions.

According to an embodiment of the above mentioned first aspect, the at least one controllable switch includes at least one Field Effect Transistor, FET.

FETs have a fast switching time, which results in that the current through the FETs may be broken very quickly when an overcurrent is detected.

According to an embodiment of the above mentioned first aspect, the transistor network (TN) is further arranged to control the at least one controllable switch based on at least one of a first voltage (V1) of a first node of the impedance network (Z) and a second voltage (V2) of a second node of the impedance network (Z).

Generally, by basing the control of the at least one switch on voltages/potentials of nodes in the impedance network, the control may detect overcurrents and/or short circuits, and may therefore open the switches so as to avoid damage of circuits/components and of the at least one electrical load.

By using both the first V1 and second V2 voltages as a basis for the control, detection of both short circuits (by use of the first voltage V1) and overcurrents (by use of the second voltage V2) is possible. Hereby, an improved detection is possible. Further, the first V1 and second V2 voltages may be used for determining power consumption patterns of the at least one load and/or for determining the type of the at least one electrical load.

According to an embodiment of the above mentioned first aspect, the second voltage (V2) is a difference voltage between the second node and a reference ground ($REF_{GND}$), the reference ground ($REF_{GND}$) being different from at least one reference voltage for the at least one electrical load.

Correspondingly, according to an embodiment of the above mentioned first aspect, the first voltage (V1) is a difference voltage between the first node and a reference ground (REF$_{GND}$), the reference ground (REF$_{GND}$) being different from a reference voltage for the at least one electrical load.

By having a reference ground REF$_{GND}$ for the first V1 and/or second V2 voltages which is different from the reference voltage for the load makes it possible to use smaller and cheaper electrical components in the circuit, since these electrical components then do not have to be adapted to high voltages, such as 230 and 110 volts (AC). Further, the present circuit for breaking alternating current may then be coupled to, and mounted in, conventional circuit breakers.

According to an embodiment of the above mentioned first aspect, the circuit further comprises:
  a combining circuit; and
  a controller (C) coupled to a reference ground (REF$_{GND}$) common to the controller (C) and the at least one controllable switch, and arranged to measure the at least one voltage (V1; V2) of the at least one node of the impedance network (Z); wherein
  the combining circuit is arranged to provide a combined control of the at least one controllable switch based on the value of the at least one voltage (V1; V2) by use of the transistor network (TN) and of the controller (C).

Hereby, the combined control is provided by both the transistor network (TN) and the controller (C), where both of the transistor network (TN) and the controller (C) contribute with their respective advantageous features. For example, the transistor network (TN) provides for a very fast switching, and the controller (C) provides for an advanced and exact switching, which may be based e.g. on consumption patterns. Also, by the combined control of the at least one controllable switch, using both the transistor network (TN) and the controller (C), breaking of the alternating current AC may be effected already at very low power consumptions.

According to an embodiment of the above mentioned first aspect, the controller (C) is further arranged to control the at least one controllable switch such that breaking of the alternating current (AC) is triggered for a lower power consumption of the at least one electrical load than a power consumption that would trigger breaking of the alternating current (AC) when the at least one controllable switch is controlled by the transistor network (TN) alone.

Hereby, e.g. longer periods of smaller overcurrents may cause breaking of the alternating current (AC) when the controller (C) is active in the control, whereas such smaller overcurrents would not trigger breaking of the alternating current (AC) when only the transistor network performs the control.

According to an embodiment of the above mentioned first aspect, the controller (C) is further arranged to:
  monitor a power consumption pattern of the at least one electrical load; and
  control the at least one controllable switch based on the monitored power consumption pattern of the at least one electrical load.

Hereby, an upcoming overcurrent and/or short circuit problem may be predicted, for example by a comparison of the pattern with historical data.

According to an embodiment of the above mentioned first aspect, the controller (C) is further arranged to control the at least one controllable switch such that breaking of the alternating current (AC) is effected if the power consumption pattern is irrational.

Hereby, an upcoming overcurrent and/or short circuit problem may be predicted, since the power consumption pattern may for example be compared to historical data and/or to data charts for the loads to determine if the pattern could possibly result in a problem.

According to an embodiment of the above mentioned first aspect, the controller (C) is further arranged to determine the type of the at least one electrical load based on the monitored power consumption pattern.

Hereby, the determined type of the load may be stored and/or communicated to be used for processing in the circuit and/or in devices coupled to the circuit.

According to an embodiment of the above mentioned first aspect, the controller (C) is further arranged to control the at least one controllable switch based on the determined type.

When the type of the load has been determined, specific data for the load may be taken into consideration when controlling the switching, such that a tailored switching is effected which is suitable for that specific type of load.

According to an embodiment of the above mentioned first aspect, the controller (C) is further arranged to:
  receive one or more of at least one information element (IE) and at least one instruction (I) associated with the at least one electrical load; and
  control the at least one controllable switch based on one or more of the at least one information element (IE) and the at least one instruction (I).

Hereby, the controller (C) may make use of information produced/determined in other circuits and/or devices when controlling the at least one controllable switch, which may improve the switching of the least one switch.

According to an embodiment of the above mentioned first aspect, the controller (C) comprises any of wireless receiving means and wired receiving means arranged to receive communication signals comprising an indication of at least any of the at least one information element (IE) and the at least one instruction element (I).

Thus, the controller (C) may comprise wireless receiving means only, wired receiving means only, or wireless and wired receiving means, which provides for a reliable communication with other circuits and/or devices.

According to an embodiment of the above mentioned first aspect, the transistor network (TN) is an autonomous network arranged to control the at least one controllable switch based only on the at least one voltage (V1; V2).

Hereby, the switching controlled by the transistor network may be very fast. Also, the autonomous transistor network does also not need a power supply to work.

According to an embodiment of the above mentioned first aspect, the transistor network (TN) is arranged to control the at least one controllable switch based on at least one voltage comparison.

Thus, the transistor network here functions as a very fast comparator circuit.

According to an embodiment of the above mentioned first aspect, one or more of the at least one transistor ($T_{TN1}$; $T_{TN2}$) comprised in the transistor network (TN) are supplied with at least one bias voltage ($V_{bias1}$; $V_{bias2}$).

Hereby, the at least one transistor may act on currents/voltages being lower than what is possible without use of the at least one bias voltage ($V_{bias1}$; $V_{bias2}$), i.e. lower currents than possible based on the transistor composition itself.

According to an embodiment of the above mentioned first aspect, the transistor network (TN; 110) comprises at least one resistor ($R_{TN1}$; $R_{TN2}$) coupled in series to a controlling input of the at least one transistor ($T_{TN1}$; $T_{TN2}$), the at least one resistor ($R_{TN1}$; $R_{TN2}$) having a resistance such that:
  the at least one transistor ($T_{TN1}$; $T_{TN2}$) is protected; and a time period during which the at least one transistor ($T_{TN1}$; $T_{TN2}$) operates in its linear region is reduced.

Hereby, the components of the transistor network are protected at the same time as the function of the at least one transistor ($T_{TN1}$; $T_{TN2}$) is predictable.

According to a second aspect of the invention, the above mentioned and other objectives are achieved with an alternating current breaking arrangement comprising:

the alternating current breaking circuit according to any one of the embodiments of the first aspect or according to the first aspect as such; and a power supply circuit arranged to provide electrical power for driving the alternating current breaking circuit, the power supply circuit comprising:

a first parasite arrangement arranged to extract a first parasite voltage ($V_{par1}$, from the alternating current (AC);

a second parasite arrangement arranged to extract a second parasite voltage ($V_{par2}$) from the alternating current (AC); and a voltage combiner arranged to combine the first parasite voltage ($V_{par1}$) and the second parasite voltage ($V_{par2}$).

The first parasite arrangement works well for higher power and the second parasite arrangement works well for lower power. Therefore, the first and second parasite arrangements complement each other very well, and a reliable power supply is provided for most situations. A reliable and useful combined parasite voltage $V_{par\_comb}$ may hereby be provided as a power supply to the alternating current (AC) breaking circuit during essentially any operational condition.

According to an embodiment of the above mentioned second aspect, the first parasite arrangement comprises a transformer arranged to generate the first parasite voltage ($V_{par1}$, from the alternating current (AC).

The transformer, and therefore also the first parasite arrangement, is well suited to create the first parasite voltage $V_{par1}$ during strong currents.

According to an embodiment of the above mentioned second aspect, the second parasite arrangement is arranged to extract a second parasite voltage ($V_{par2}$) by one or more in the group of:

extracting a portion of an amplitude of a voltage corresponding to the alternating current (AC); and extracting a time duration portion of a cycle of a voltage corresponding to the alternating current (AC).

Hereby, the second parasite arrangement is well suited for extracting voltages in lower power situations/implementations, i.e. for weaker AC currents.

According to an embodiment of the above mentioned second aspect, the voltage combiner comprises two rectifying diodes.

By use of the voltage combiner, the two extracting methods are combined, and a reliable and useful combined parasite voltage $V_{par\_comb}$ may be provided as a power supply to the alternating current AC breaking circuit both during lower and higher power conditions.

According to an embodiment of the circuit for breaking alternating current AC, the circuit further comprises a driver circuit coupled between the controller (C) and/or the transistor network (TN) and the at least one controllable switch, wherein the driver circuit is arranged to amplify control signals used by the controller (C) and/or the transistor network (TN) for controlling the at least one controllable switch.

The control signals from the controller (C) and/or transistor network (TN) often have a too low voltage or current, which means that the at least one switch may not open or close as desired. The driver circuit solves this problem by amplifying the control signals transmitted by the controller (C).

According to an embodiment of the circuit for breaking alternating current AC, the impedance network comprises a limiting/delay circuit coupled between the first controllable switch and the second controllable switch, wherein the limiting/delay circuit is arranged to limit/delay the speed of changes of the alternating current.

With the limiting/delay circuit it is possible to detect an overcurrent and open the at least one controllable switch before the current has reached damaging levels since the limiting/delay circuit limits/delays the overcurrent.

According to an embodiment of the circuit for breaking AC, the limiting/delay circuit has an inductor. The limiting/delay is a choke coil according to an embodiment.

According to an embodiment of the circuit for breaking AC, the controller (C) is further arranged to transmit any of the monitored power consumption pattern and determined type for the at least one load to another controller or system.

According to an embodiment of the above-mentioned aspects, the at least one electrical load is any of a household appliance and an electrical heater. Also, the electrical load may be essentially any electrical device that is connected to the output of the circuit for breaking AC and is configured to be fed with AC.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
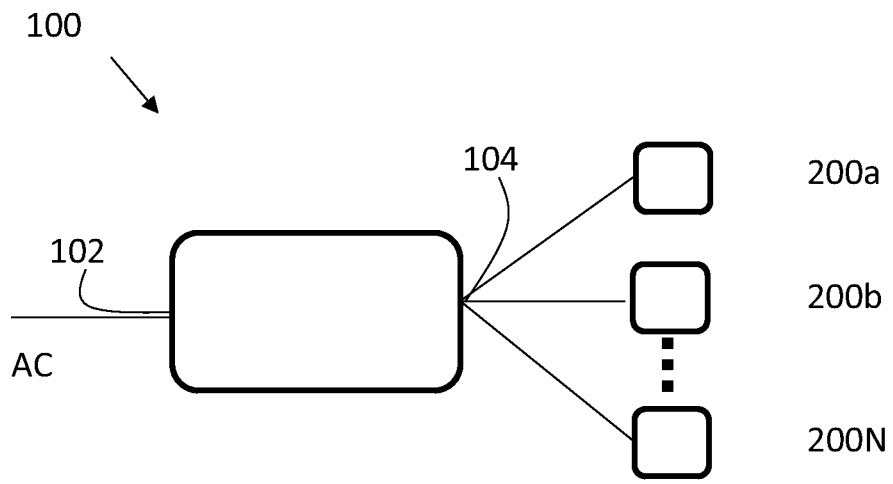
FIG. 1 shows a circuit according to an embodiment of the invention.

FIG. 1 schematically illustrates a circuit 100 for breaking alternating current according to an embodiment of the invention. The circuit 100 may be coupled to one or more electrical loads 200*a*, 200*b*, . . . 200N (having index n=a, b, . . . , N). An alternating current (AC) is fed to the input 102 of the circuit 100 and forwarded to the loads 200*a*, 200*b*, . . . 200N via the output 104 of the circuit 100. The current is, according to an embodiment, a so-called mains alternating current. The loads 200*a*, 200*b*, . . . 200N may therefore comprise household appliances and/or electrical heaters and/or other household electronics.

Figure 2:
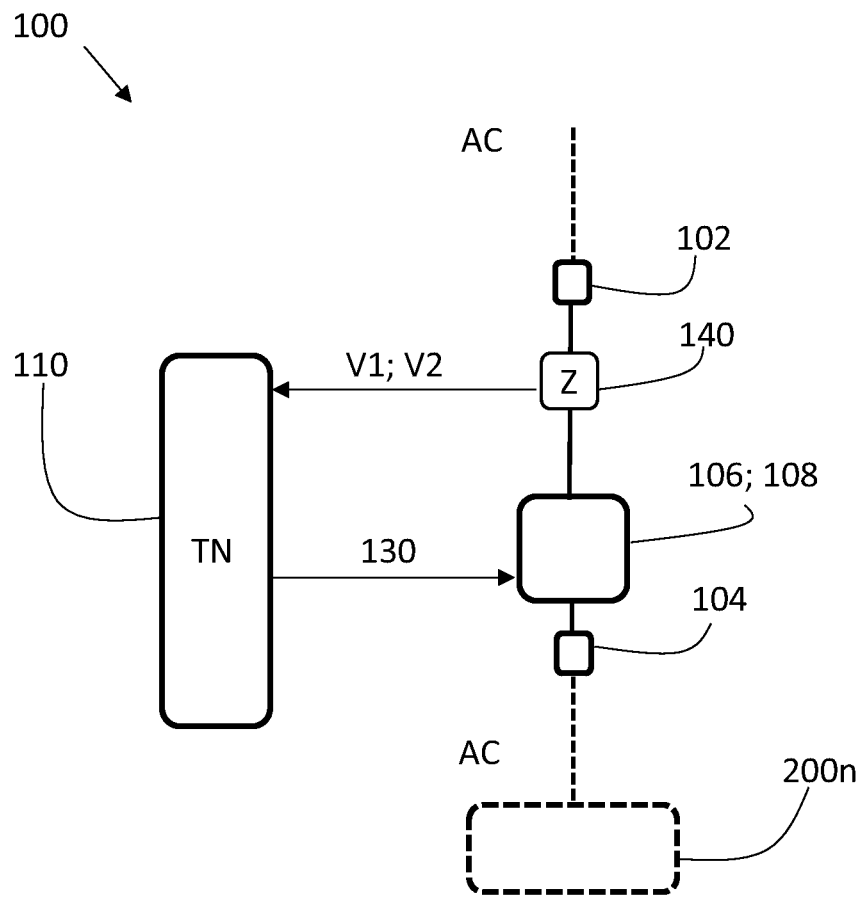
FIG. 2 shows a circuit according to an embodiment of the invention.

FIG. 2 schematically shows an embodiment of a circuit 100 for breaking alternating current according to the invention. The circuit 100 comprises an input 102 arranged to receive alternating current (AC), and an output 104 arranged to provide the current to at least one electrical load 200*n*, as mentioned above. The circuit 100 further comprises at least one controllable switch 106; 108 coupled between the input 102 and the output 104. The at least one controllable switch 106; 108 may e.g. comprise one or more relay, thyristor, triac, gate turn off thyristor, transistor and/or any other type of silicon controlled rectifier or switch.

The circuit 100 further comprises an impedance network (Z) 140, which is coupled between the input 102 and the output 104 in series with the at least one controllable switch 106; 108. In the embodiment shown in FIG. 2, the impedance network (Z) 140 is coupled between the input 102 and the at least one controllable switch 106; 108. However, the impedance network (Z) 140 may also be coupled between the at least one controllable switch 106; 108 and the output 104.

The circuit 100 also comprises a transistor network (TN) 110, which comprises at least one transistor $T_{TN1}$; $T_{TN2}$ described more in detail below. The transistor network (TN) 110 is arranged to control the at least one controllable switch 106; 108. Hereby, the breaking of the alternating current (AC) provided to the at least one electrical load 200*n* is controlled. At least one voltage V1; V2 of at least one node of the impedance network (Z) 140 is supplied to, and controls, the at least one transistor $T_{TN1}$; $T_{TN2}$, wherefore the control of the at least one controllable switch 106; 108, and thus also the control of the breaking of the alternating current (AC), is based on the value of the least one voltage V1; V2.

The control of the at least one controllable switch 106; 108 may be performed using control means 130 coupled between the transistor network (TN) 110 and the least one controllable switch 106; 108 as shown in FIG. 2. The control means 130 may carry control signals, e.g. one or more different control voltages or currents, which may have different levels suitable for opening and closing the at least one controllable switch 106; 108. If an overcurrent is detected, the least one controllable switch 106; 108 is switched open, whereby breaking of the applied current is effected. Since the control of the at least one controllable switch 106; 108 is provided by the at least one transistor $T_{TN1}$; $T_{TN2}$, the switching, and thus also the breaking of the alternating current, may be effected very quickly. Thereby, the risk for damages of the loads 200*n* and/or the circuit 100 itself due to the current triggering the switching is very low.

Figure 3A:
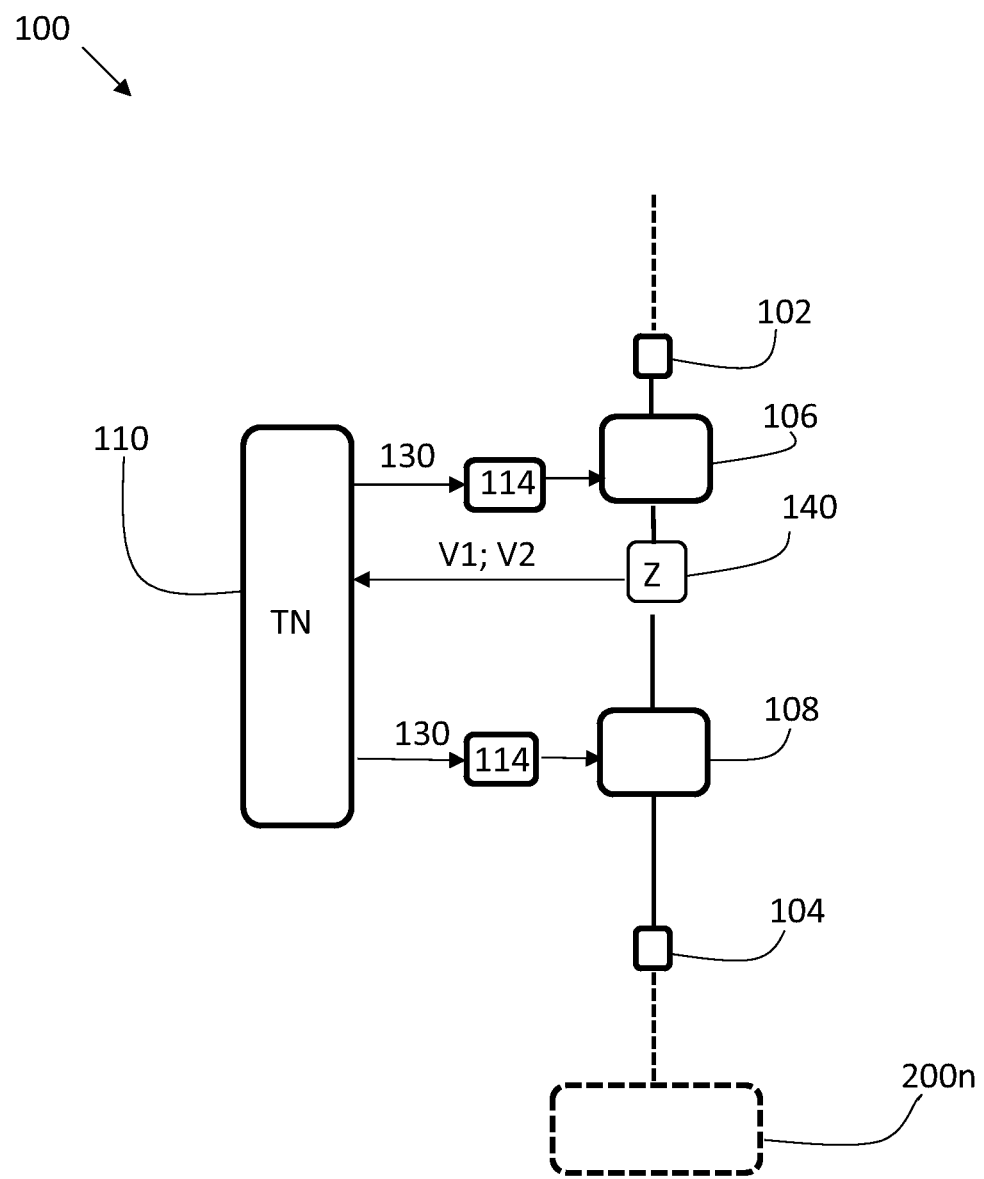
FIGS. 3a-b shows a circuit according to an embodiment of the invention.

FIG. 3*a* shows an embodiment of a circuit 100 for breaking alternating current according to the invention. The circuit 100 in this embodiment comprises two controllable switches, i.e. a first controllable switch 106 and a second controllable switch 108, that are coupled in series with each other and being arranged between the input 102 and the output 104 as shown in FIG. 3*a*. The first controllable switch 106 and the second controllable switch 108 may be coupled in opposite directions between the input 102 and the output 104. As mentioned above, the transistor network (TN) 110 is arranged to control the two controllable switches 106; 108 based on the at least one voltage V1; V2 of at least one node of the impedance network (Z) 140. When the circuit 100 comprises two controllable switches 106; 108, the impedance network (Z) 140 may be arranged between the first controllable switch 106 and the second controllable switch 108, as illustrated in FIG. 3*a*.

The at least one controllable switch 106, 108 mentioned in this document may, according to an embodiment, include at least one Field Effect Transistor (FET). A FET blocks the current in one direction, and two FETs may hence, according to an embodiment, be coupled in opposite directions relative to the direction of the current. The FETs have a fast switching time (the time period for opening or closing the switch), which means that the current through the FETs may be broken very quickly when an overcurrent is detected. Hereby, damages to circuits and loads coupled to the output 104 may be limited and/or eliminated. Preferably, the two FETs are according to an embodiment controlled with the same control means using a common gate voltage, thereby simplifying the architecture. The example embodiment illustrated in FIG. 3*a* shows that the transistor network (TN) 110 controls the two controllable switches 106, 108 via separate control means 130. However, the controller (C) 110 may also control the two switches 106, 108 via common control means 130 as described above.

Figure 3B:
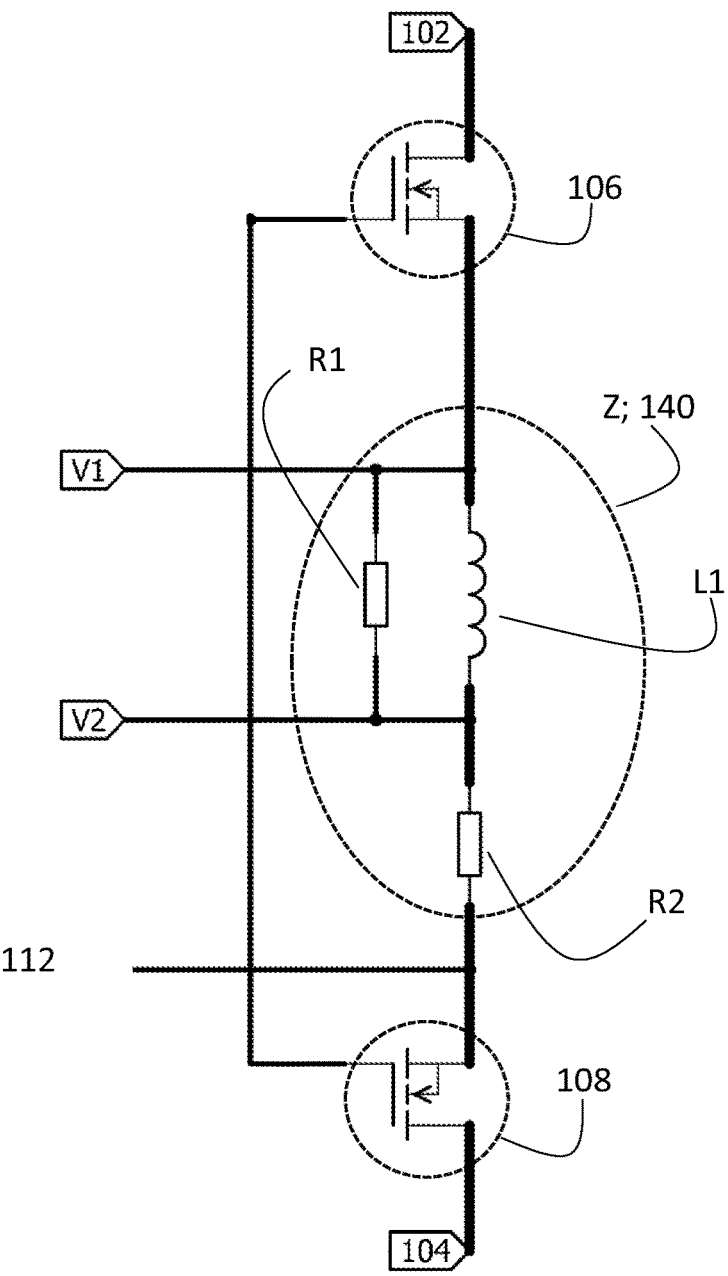

FIG. 3*b* shows some parts of the circuit 100 according to an embodiment more in detail. According to an embodiment mentioned above, the circuit 100 comprises two controllable switches formed by a first FET 106 and a second FET 108 coupled in series in opposite directions relative to the current between the input 102 and the output 104. The two FETs are controlled by the same control means 130 using the same control voltage as gate voltage, as mentioned above. FIG. 3*b* further shows the impedance network (Z) 140 coupled between the FETs more in detail, and how the first voltage V1 and the second voltage V2 are provided.

The impedance network (Z) 140 may generally be configured such that at least one voltage V1; V2 can be measured/detected/provided at the impedance network (Z) 140. One solution is to have a measuring resistor over which a voltage is measured/detected/provided. A reference value for the resistance of the measuring resistor may e.g. be approximately 0.01 Ohm or lower for AC mains, e.g. 110 or 230 Volts. The voltage may then, as is described in detail below, be compared with a threshold voltage in a comparator circuit, and if the voltage exceeds the threshold voltage, the at least one controllable switch 106, 108 are controlled to take an open position so as to prevent that an overcurrent damages circuits/components and/or the at least one electrical load coupled to the output 104. Hence, the at least one voltage is used for detecting overcurrent.

The impedance network (Z) 140 includes, according to an embodiment, a first resistor R1 coupled in parallel with an inductor L1. The first resistor R1 and the inductor L1 may be coupled together in series with a second resistor R2. According to some embodiments, the second resistor R2 may be omitted. The first voltage V1 is available/measured/detected (as a potential difference) between a potential of a first node and the reference ground $REF_{GND}$ 112. The first node is located between the first controllable switch 106 and the parallel coupling of the first resistor R1 and the inductor L1. The reference ground $REF_{GND}$ 112 is here different from a reference voltage for the at least one electrical load 200*n*, which may be a zero/neutral voltage, an earthed/grounded neutral voltage, a protective earth/ground voltage, another phase and/or another suitable reference potential of a network to which the at least one load 200n is connected. The first voltage V1 is related to the change of the load coupled to the output 104, and thus indicates a short circuit.

The second voltage V2 is available/measured (as a potential difference) between a second node and the reference ground $REF_{GND}$ 112. The reference 112 is different from the reference voltage for the at least one electrical load 200n, as mentioned above. The second node is located between the second resistor R2 and the parallel coupling of the first resistor R1 and the inductor L1. Hence, the second voltage V2 is obtained over the second resistor R2, and is directly proportional to the current flowing through the second resistor R2, and thus also through the alternating current breaking circuit 100, and indicates overcurrent. The second voltage V2 is therefore also suitable for monitoring the power consumption of the at least one load 200n and may be used for determining the power consumption pattern. Further, at low frequencies, the alternating current AC passes through the inductor L1, i.e. the inductor L1 is essentially a shortcut, and the second resistor R2, which in that case gives the relation that the first and second voltages are equal; V1=V2. If the one or more loads coupled to the output 104 are changing quickly (which can be seen as a high frequency signal), then inductor L1 has a high impedance and acts as a current brake or stopper. The voltage over the inductor L1 is thus related to the frequency, and may therefore be very high, since the impedance increases with increasing frequency. In this case, the first resistor R1 acts as a current shunt preventing that the voltage gets too high. According to an embodiment, at least one protection circuit, including e.g. at least one diode having a Zener functionality, is coupled in parallel with the inductor L1 and the first resistor R1.

According to an embodiment, the impedance network (Z) 140 comprises a limiting/delay circuit coupled between the first controllable switch 106 and the second controllable switch 108. The limiting/delay circuit is arranged to limit/delay the speed of changes of the current, e.g. an overcurrent. The limitation/delay is preferably of an order such that the transistor network 110 via the at least one controllable switch 106; 108 has time to detect an overcurrent and break the current before the overcurrent reaches the circuits/components and/or the at least one electrical load connected to the output 104. The overcurrent, which is also known as an overload, is often due to short circuits, overloading of electrical loads, mismatch of electrical loads, and electrical device failures. There are a number of different solutions for providing a limiting/delay circuit. In one solution, the limiting/delay circuit includes an inductor shown as L1 in FIG. 3b.

According to an embodiment illustrated in FIG. 3a, the circuit 100 comprises at least one driver circuit 114 coupled between the transistor network (TN) 110 and the controllable switches 106, 108. The at least one driver circuit 114 is arranged to amplify control signals used by the transistor network (TN) 110 for controlling the switches 106, 108 via the control means 130. This may be needed e.g. when the control voltages and/or currents transmitted to the controllable switch has to be boosted/amplified. For example, the driver circuit 114 can be arranged to be fed with 10-15 Volts and to deliver this voltage to the gate side of the FET. A driver circuit 114 may, according to some embodiments, be implemented between the transistor network (TN) 110 and/or the controller (C) 120 described below, and the at least one controllable switch 106; 108 in any one of the in this documents described embodiments of the circuit 100.

Figure 4:
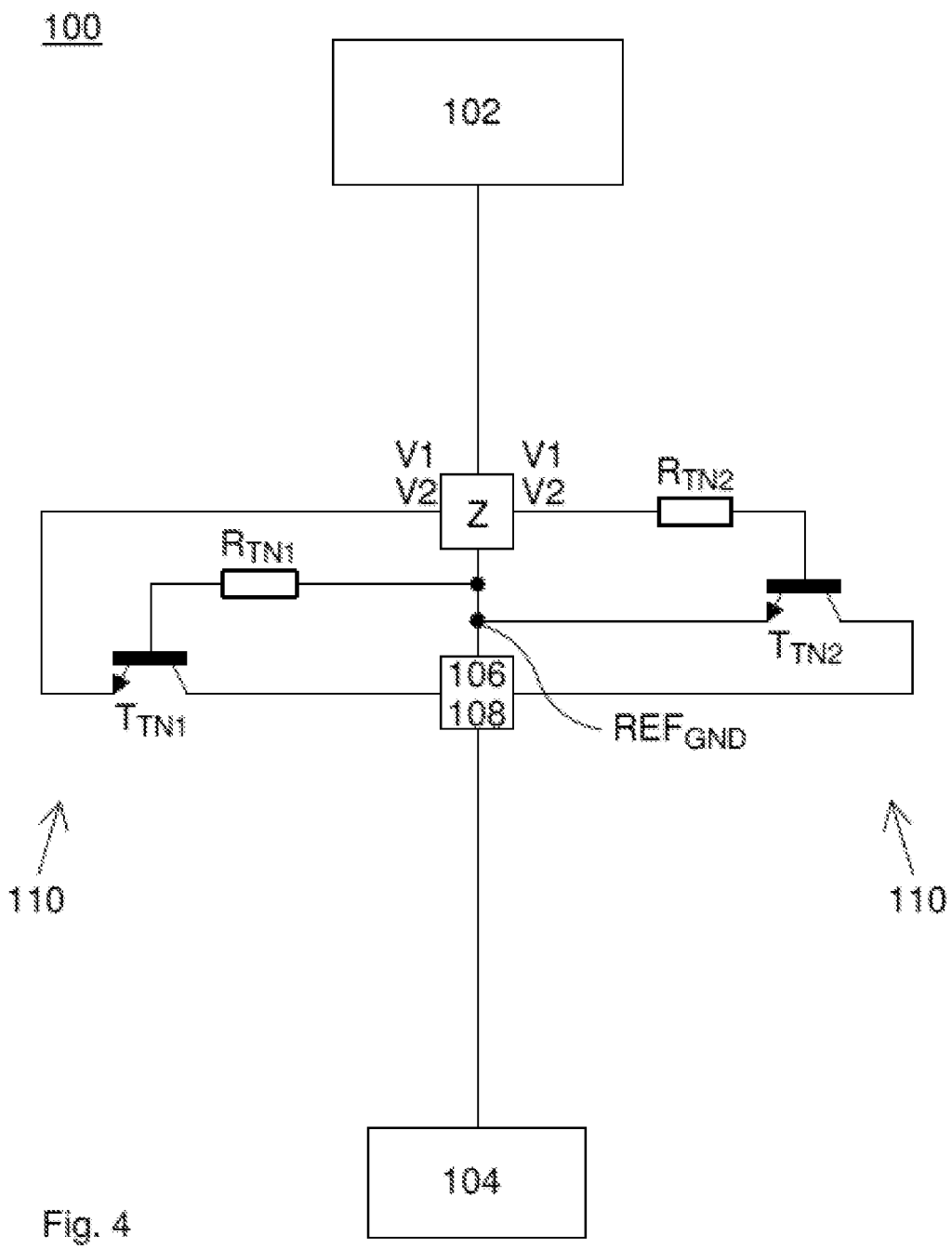
FIG. 4 shows a circuit according to an embodiment of the invention.
Figure 5:
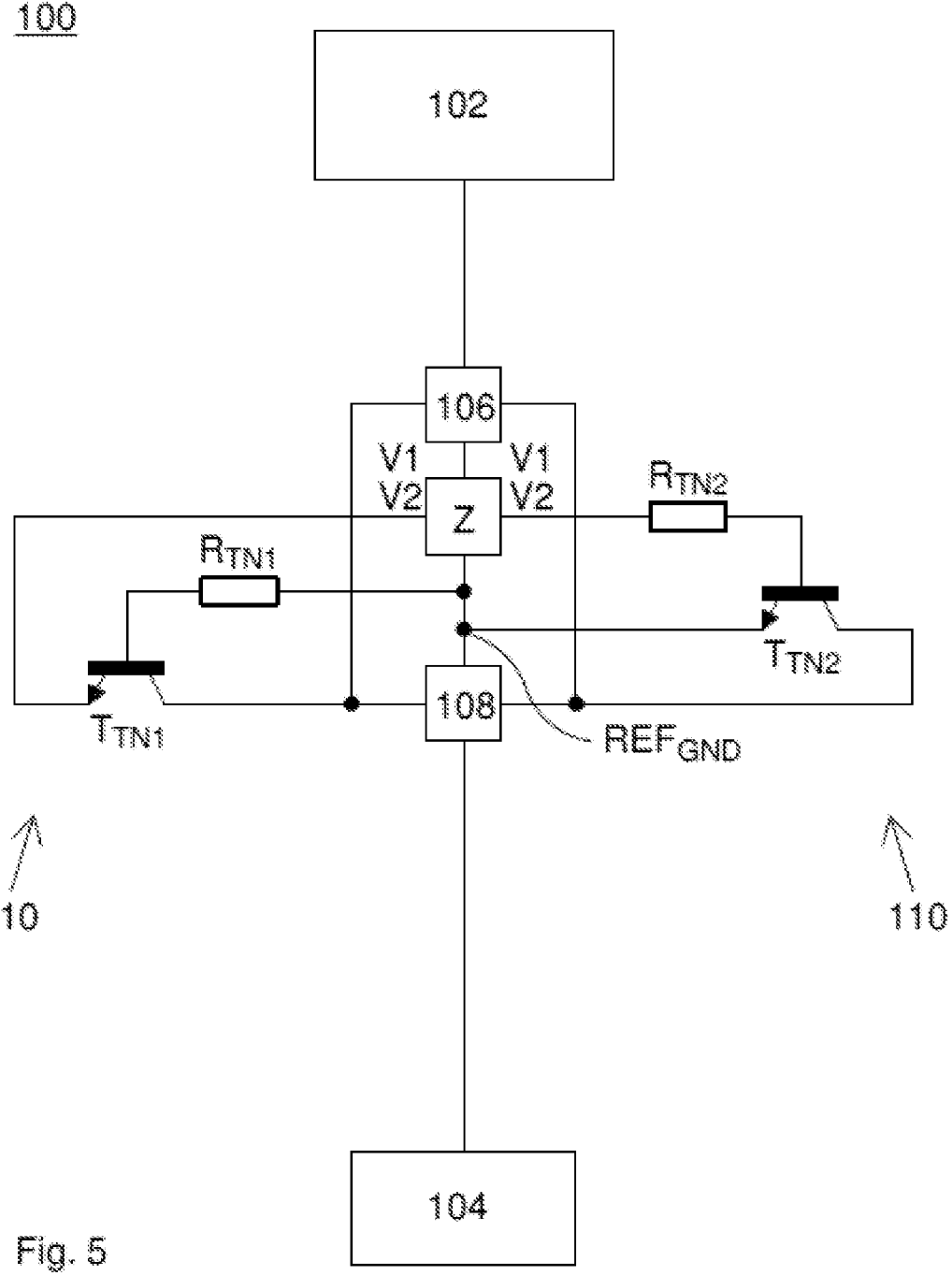
FIG. 5 shows a circuit according to an embodiment of the invention.

FIGS. 4 and 5 schematically illustrate the transistor network 110 more in detail for some embodiments.

As mentioned above, the circuit 100 for breaking alternating current comprises an input 102, an output 104, and at least one controllable switch 106; 108 and an impedance network (Z) 140 coupled between the input 102 and the output 104. In the embodiment shown in FIG. 4, the impedance network (Z) 140 is coupled between the input 102 and the at least one controllable switch 106; 108. However, the impedance network (Z) 140 may also be coupled between the at least one controllable switch 106; 108 and the output 104.

In the embodiment shown in FIG. 5, the circuit 100 comprises two controllable switches 106; 108 between the input 102 and the output 104, and the impedance network (Z) 140 is coupled between the first controllable switch 106 and the second controllable switch 108.

The transistor networks (TN) 110 of the embodiments shown in FIGS. 4 and 5 comprise two transistors $T_{TN1}$; $T_{TN2}$ arranged for controlling the at least one controllable switch 106; 108, such that breaking of the alternating current (AC) is controlled, based on the at least one voltage V1; V2 of the at least one node of the impedance network (Z) 140, as explained above.

The transistor networks (TN) 110 described for the different embodiments of this document function as autonomous networks according to some embodiments. An autonomous network is arranged to independently control the at least one controllable switch 106; 108 based only on the at least one voltage V1; V2. The transistor network (TN) 110 does thus not need to be controlled itself, and does also not, according to some embodiments, need to be externally supplied with power/voltage to perform the control of the at least one controllable switch 106; 108.

The transistor networks (TN) 110 described in this document may also, according to some embodiments, be arranged to function as voltage comparator circuits, i.e. circuits that control the at least one controllable switch 106; 108 based on at least one voltage comparison.

The transistor networks (TN) 110 of the herein described embodiments may comprise at least one resistor $R_{TN1}$; $R_{TN2}$ coupled in series with a controlling input of the at least one transistor $T_{TN1}$; $T_{TN2}$. As shown in e.g. FIGS. 4 and 5, the transistor network (TN) 110 may comprise two resistors $R_{TN1}$; $R_{TN2}$, one resistor coupled in series with the controlling input of each one of the two transistors $T_{TN1}$; $T_{TN2}$.

More in detail, a first resistor $R_{TN1}$ may be coupled between a reference ground $REF_{GND}$ node located between the impedance network (Z) 140 and the at least one controllable switch 106; 108, and the controlling input of the first transistor $T_{TN1}$, as illustrated in FIG. 4. For the embodiment shown in FIG. 5, having two controllable switches 106:108, the first resistor $R_{TN1}$ may be coupled between a reference ground $REF_{GND}$ node located between the impedance network (Z) 140 and the second controllable switch 108, and the controlling input of the first transistor $T_{TN1}$. Further, the emitter/source of the first transistor $T_{TN1}$ is coupled to at least one node of the impedance network (Z) 140 having a potential corresponding to the at least one voltage V1; V2. The collector/drain of the first transistor $T_{TN1}$ is coupled, possibly directly or indirectly via a driver and/or a logic circuit, to the at least one controllable switch 106; 108.

A second resistor $R_{TN2}$ may be coupled between a node of the impedance network (Z) 140, e.g. the first node providing the at least on voltage V1; V2, and the controlling input of the second transistor $T_{TN2}$, as illustrated in FIGS. 4 and 5.

Further, the emitter/source of the second transistor $T_{TN2}$ is coupled to the reference ground $REF_{GND}$ node located between the impedance network (Z) 140 and the at least one controllable switch 106:108. For the embodiment shown in FIG. 5, having two controllable switches 106:108, the emitter/source of the second transistor $T_{TN2}$ is coupled to a reference ground $REF_{GND}$ node located between the impedance network (Z) 140 and the second controllable switch 108. The collector/drain of the second transistor $T_{TN2}$ is coupled, possibly directly or indirectly via a driver and/or a logic circuit, to the at least one controllable switch 106; 108.

The herein described one or more transistors $T_{TN1}$; $T_{TN2}$ may be bipolar junction transistors (BJT), having a base pin as a controlling input, or may be field effect transistors (FET), having a gate pin as a controlling input. Further, bipolar junction transistors also comprise an emitter pin and a collector pin, while filed effect transistors also comprise a source pin and a drain pin.

The at least one resistor $R_{TN1}$; $R_{TN2}$ may have a resistance having a value being high enough for the at least one transistor $T_{TN1}$; $T_{TN2}$ to be protected against overcurrents. The at least one resistor $R_{TN1}$; $R_{TN2}$ may also have a resistance having a value being low enough for reducing a time period during which the at least one transistor $T_{TN1}$; $T_{TN2}$ operates in its linear region/mode.

Figure 6:
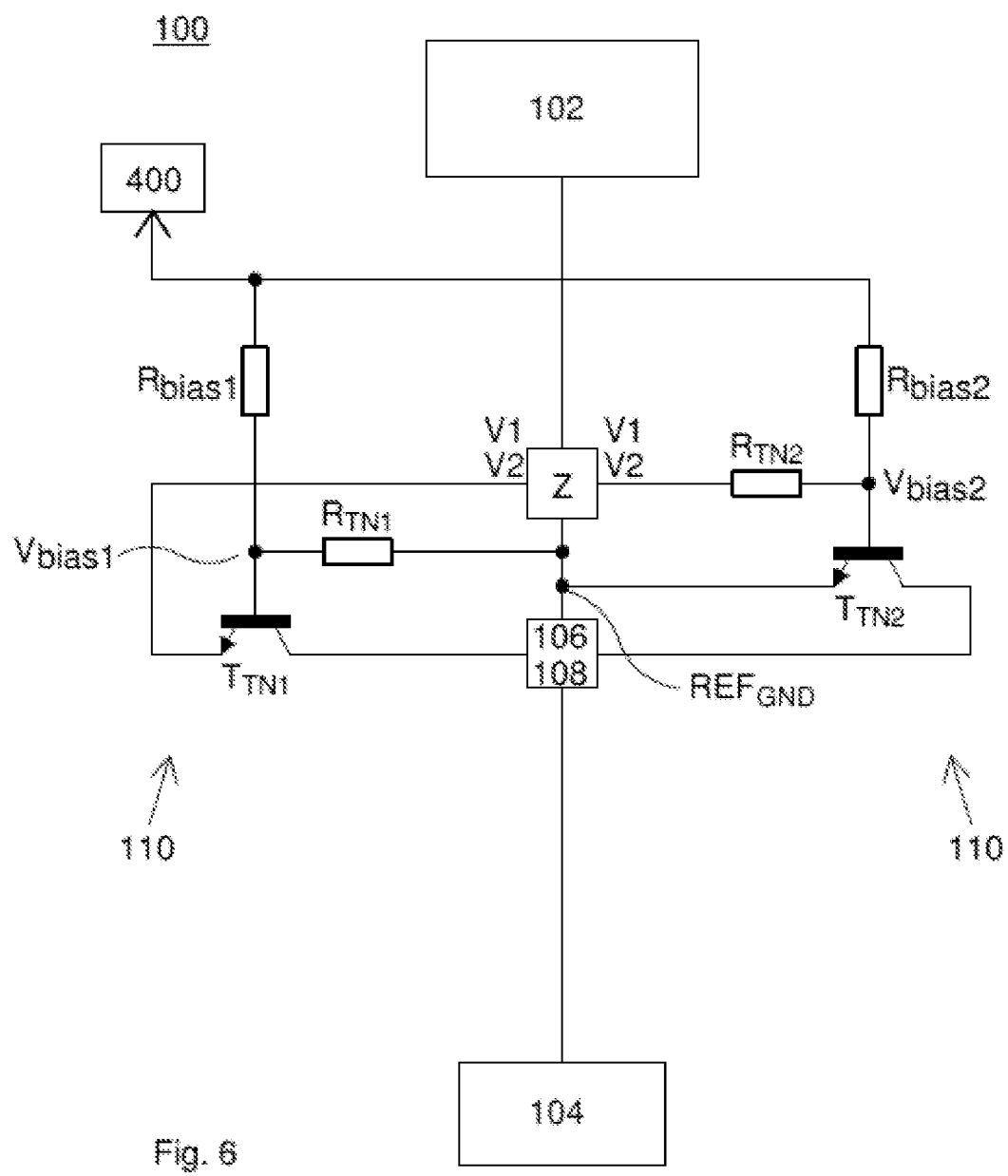
FIG. 6 shows a circuit according to an embodiment of the invention.
Figure 7:
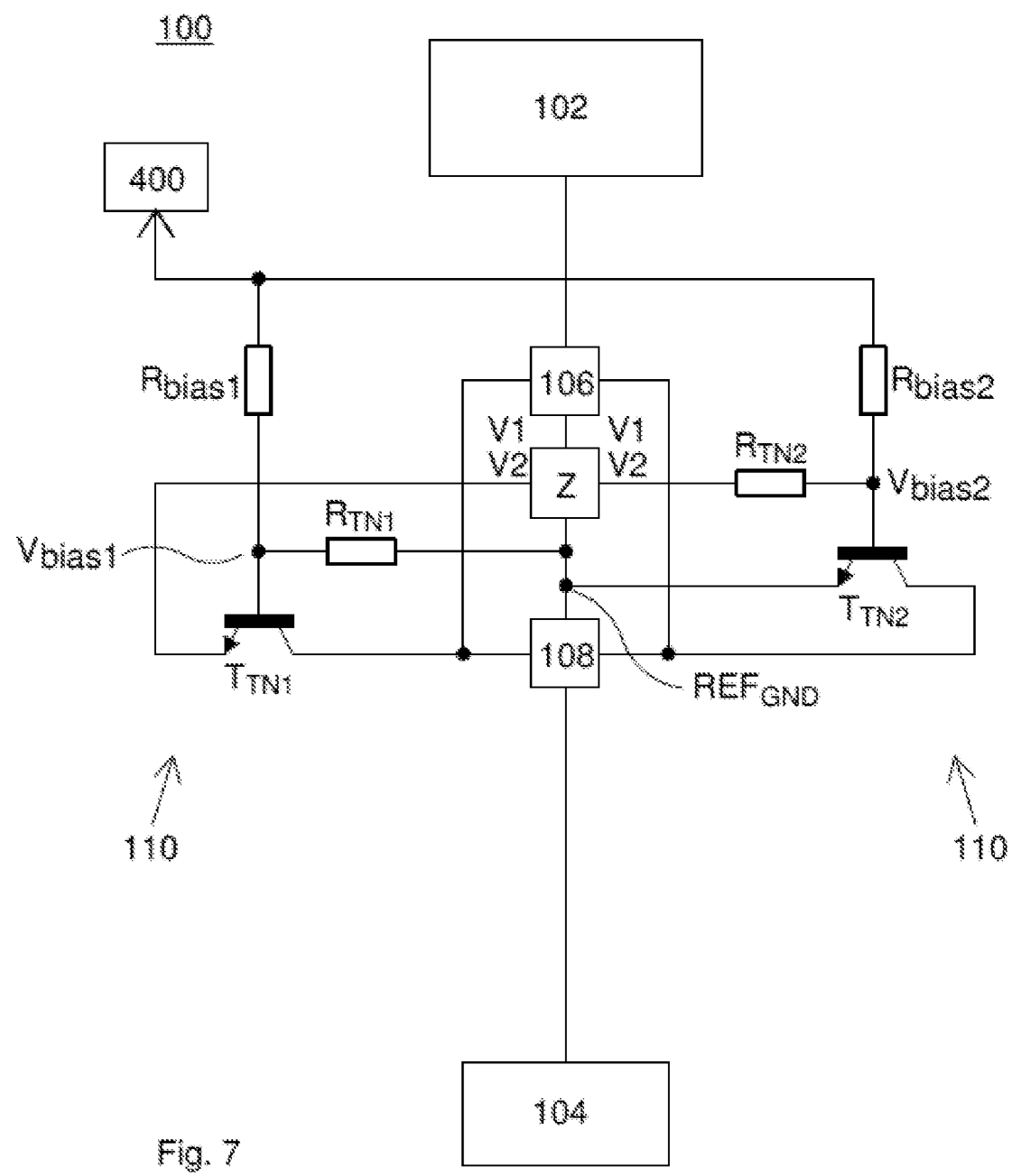
FIG. 7 shows a circuit according to an embodiment of the invention.

FIGS. 6 and 7 schematically illustrate the transistor network 110 for some embodiments, wherein one or more of the at least one transistor $T_{TN1}$; $T_{TN2}$ comprised in the transistor network (TN) 110 are supplied with at least one bias voltage $V_{bias1}$; $V_{bias2}$. FIG. 6 corresponds to FIG. 4 complemented with supply of a first $V_{bias1}$ and second $V_{bias1}$ bias voltage to the first $T_{TN1}$ and second $T_{TN2}$ transistors, respectively. FIG. 7 corresponds to FIG. 5 complemented with supply of a first $V_{bias1}$ and second $V_{bias1}$ bias voltage to the first $T_{TN1}$ and second $T_{TN2}$ transistors, respectively. Therefore, essentially only the supplied bias voltage $V_{bias1}$; $V_{bias2}$ is described below for FIGS. 6 and 7, the rest of the circuitry is described above for FIGS. 4 and 5.

As illustrated in FIGS. 6 and 7, a first bias voltage $V_{bias1}$ is provided to the controlling input of the first transistor $T_{TN1}$, by a first bias resistor $R_{bias1}$ being coupled to a source of energy. Correspondingly, a second bias voltage $V_{bias2}$ is provided to the controlling input of the second transistor $T_{TN2}$, by a second bias resistor $R_{bias2}$ being coupled to a source of energy. The source of energy may e.g. be a battery, or may be a power supply circuit 400 as the one described below.

To supply bias voltages $V_{bias1}$; $V_{bias2}$ to the controlling input of one or more of the at least one transistor $T_{TN1}$; $T_{TN2}$ makes it possible for the at least one transistor $T_{TN1}$; $T_{TN2}$ to act on, i.e. be triggered by, lower voltages/currents than allowed by the constitution of the at least one transistor $T_{TN1}$; $T_{TN2}$ itself.

Figure 8A:
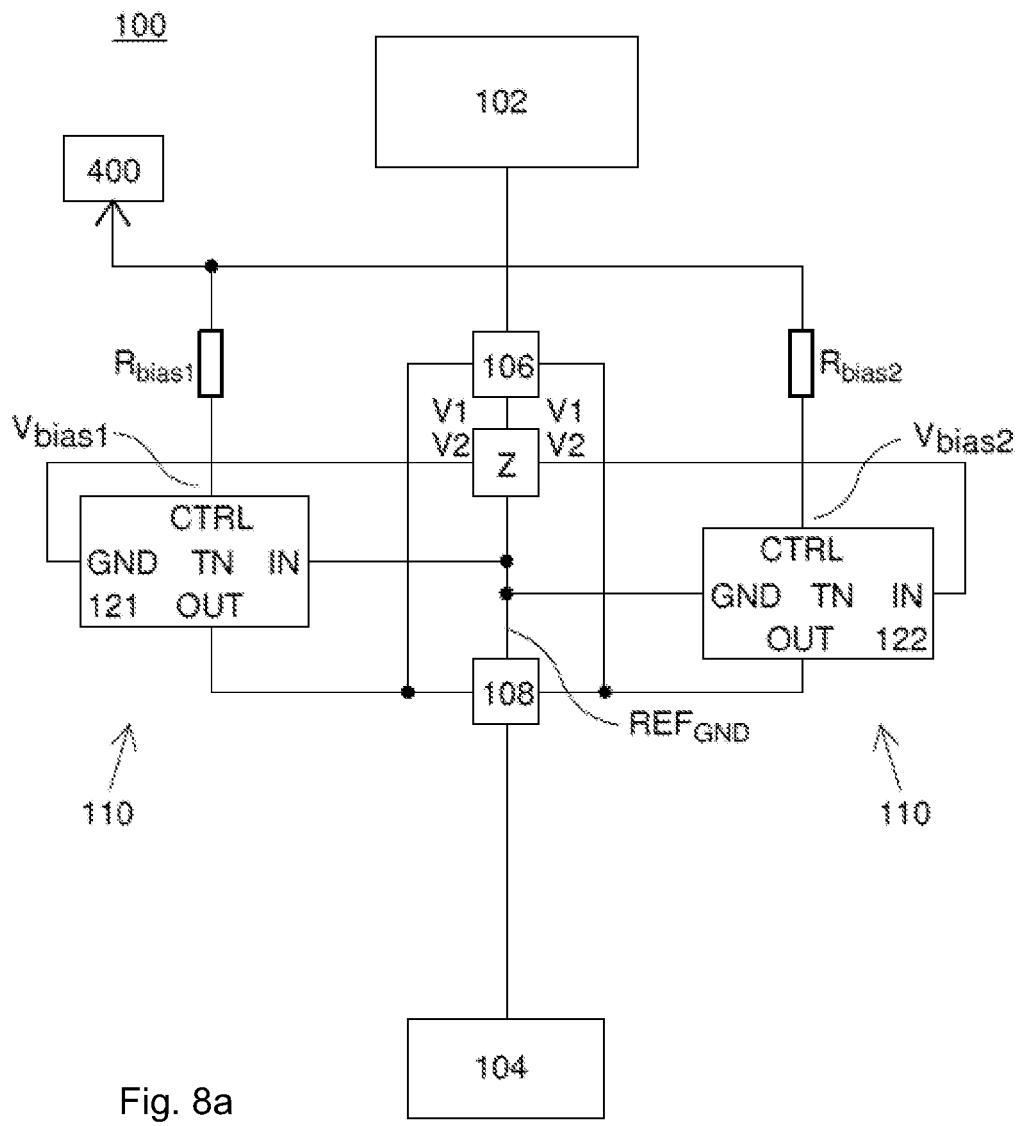
FIGS. 8a-b show a circuit according to an embodiment of the invention.
Figure 8B:
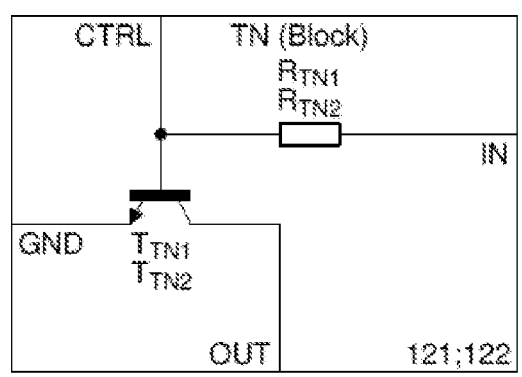
Figure 9A:
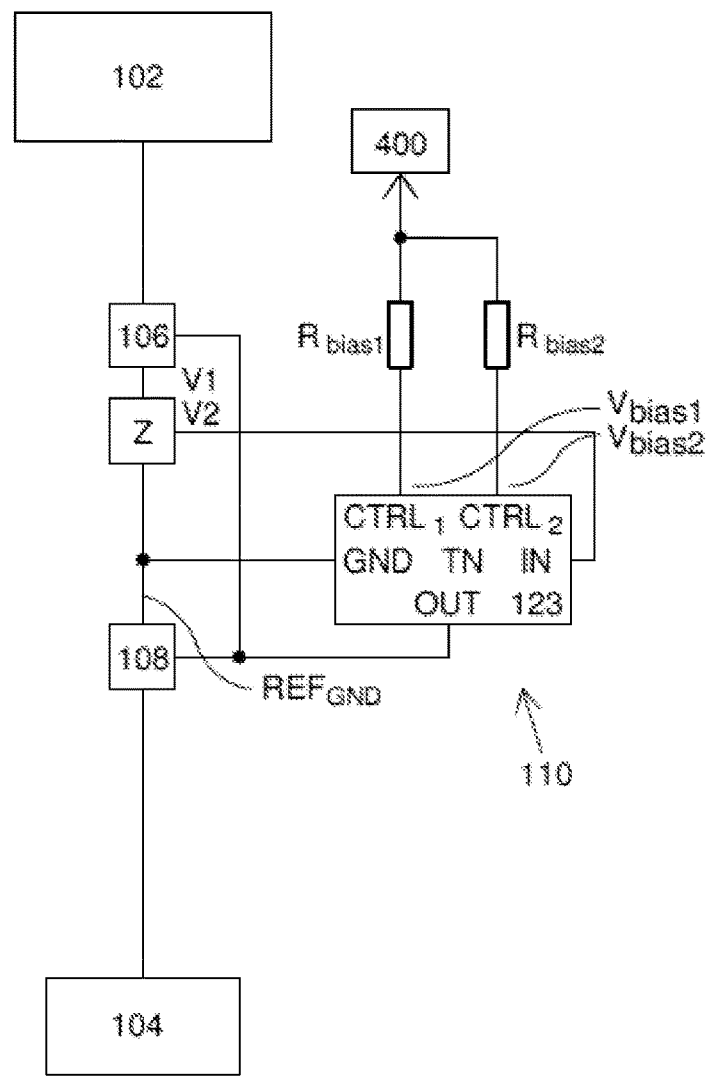
FIGS. 9a-b show a circuit according to an embodiment of the invention.
Figure 9B:
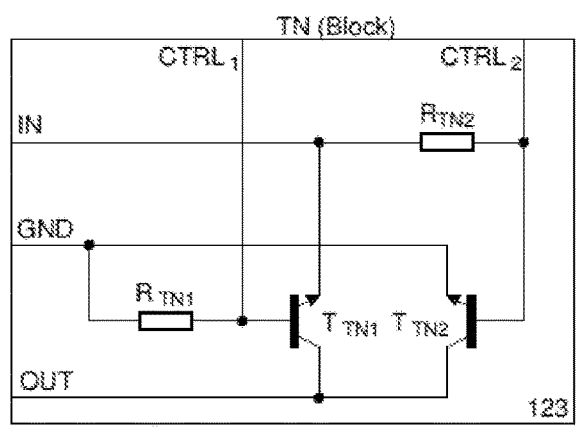

FIGS. 8a-b and 9a-b show the embodiment shown in FIG. 7 in semi-block representations. In FIGS. 8a-b, the first transistor $T_{TN1}$ and the first resistor $R_{TN1}$ are arranged in a first transistor network block (TN block) 121. The second transistor $T_{TN2}$ and the second resistor $R_{TN2}$ are arranged in a second transistor network block (TN block) 122. In FIGS. 9a-b, the first transistor $T_{TN1}$, the second transistor $T_{TN2}$, the first resistor $R_{TN1}$, and the second resistor $R_{TN2}$ are arranged in a common transistor network block (TN block) 123. Reference is here made to the descriptions above for FIG. 7 regarding the couplings and functions of the circuit 100 of FIGS. 8a-b and 9a-b.

Figure 10:
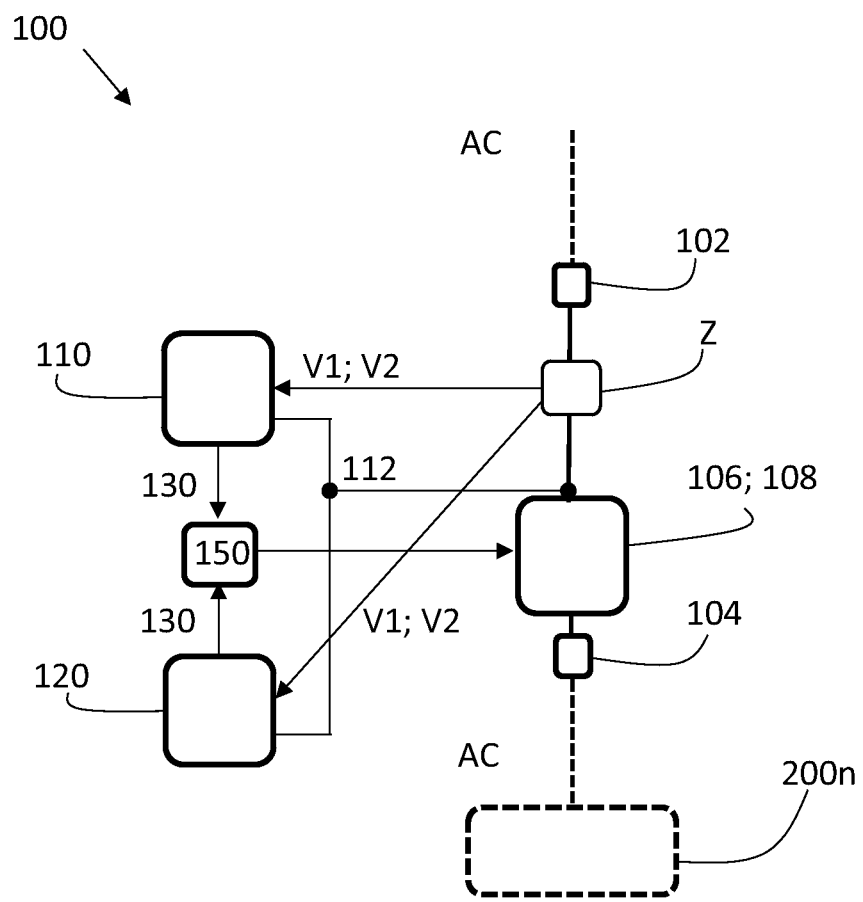
FIG. 10 shows a circuit according to an embodiment of the invention.

FIG. 10 shows a circuit according to an embodiment, in which both the transistor network (TN) 110 and a controller (C) 120 are used for controlling the at least one controllable switch 106; 108. The circuit 100 here comprises a transistor network (TN) 110 according to any one of the herein described embodiments. The circuit also comprises a controller (C) 120 coupled to a reference ground 112 corresponding to the above mentioned reference ground $REF_{GND}$ and being common to the controller (C) 120 and the at least one controllable switch 106; 108. The controller (C) 120 is arranged to measure the at least one voltage V1; V2 of the at least one node of the impedance network (Z) 140. The circuit 100 further comprises a combining circuit 150 being arranged to provide a combined control of the at least one controllable switch 106; 108 based on the value of the at least one voltage V1; V2 by use of the transistor network (TN) 110 and of the controller (C) 120. Hereby, a combined control of the at least one controllable switch 106; 108 using both the transistor network (TN) 110 and the controller (C) 120 is provided. For further details of the circuit 100 illustrated in FIG. 10, apart from the controller (C) 120, reference is made to the above description e.g. of the circuit illustrated in FIG. 2.

The controller (C) 120 may, according to an embodiment, be arranged to control, via the combining circuit 150, the at least one controllable switch 106; 108 such that breaking of the alternating current AC is triggered for a low power consumption for the at least one electrical load 200n, e.g. for a lower power consumption than a power consumption that would trigger breaking of the alternating current AC when the at least one controllable switch 106; 108 is controlled by the transistor network (TN) 110 alone. Thus, by the combined control of the at least one controllable switch 106; 108, using both the transistor network (TN) 110 and the controller (C) 120, breaking of the alternating current AC may be effected already at very low power consumptions.

According to an embodiment, the controller (C) 120 is arranged to monitor the power consumption pattern of the at least one electrical load 200n and to control the at least one controllable switch 106; 108 based on the monitored power consumption pattern of the at least one electrical load 200n. The power consumption pattern can be monitored by using and analysing the measured/detected/provided at least one voltage V1; V2 described above. Thereby, the controller (C) 120 may adapt the current fed to the load depending on the type of the load, by for example shutting down the load for safety reasons or providing a higher or lower amount of current. Also, the controller (C) 120 may be arranged to control the at least one controllable switch 106; 108 such that breaking of the alternating current AC is effected if the power consumption pattern is irrational, i.e. if the power consumption pattern appears to be unexpected and/or disadvantageous, e.g. including transients, steps, or other sudden changes.

Also, the controller (C) 120 may be further arranged to determine the type of the at least one load 200n based on the monitored power consumption pattern. Each type of load has its own power consumption pattern which can be identified. By using and analysing the measured/detected/provided at least one voltage V1; V2, as described above, the type of at least one load 200n may be determined. Hence, in this solution, the controller (C) 120 also has the capability to determine or identify the type of load, which means that the at least one controllable switch 106; 108 can be controlled based on the determined or identified type of load.

According to an embodiment, at least one driver circuit 114 may be coupled between the combining circuit 150 and the controllable switches 106, 108 (not shown in FIG. 10). The driver circuit 114 is, as mentioned above, arranged to amplify control signals used for controlling the switches 106, 108 via the control means 130.

Figure 11:
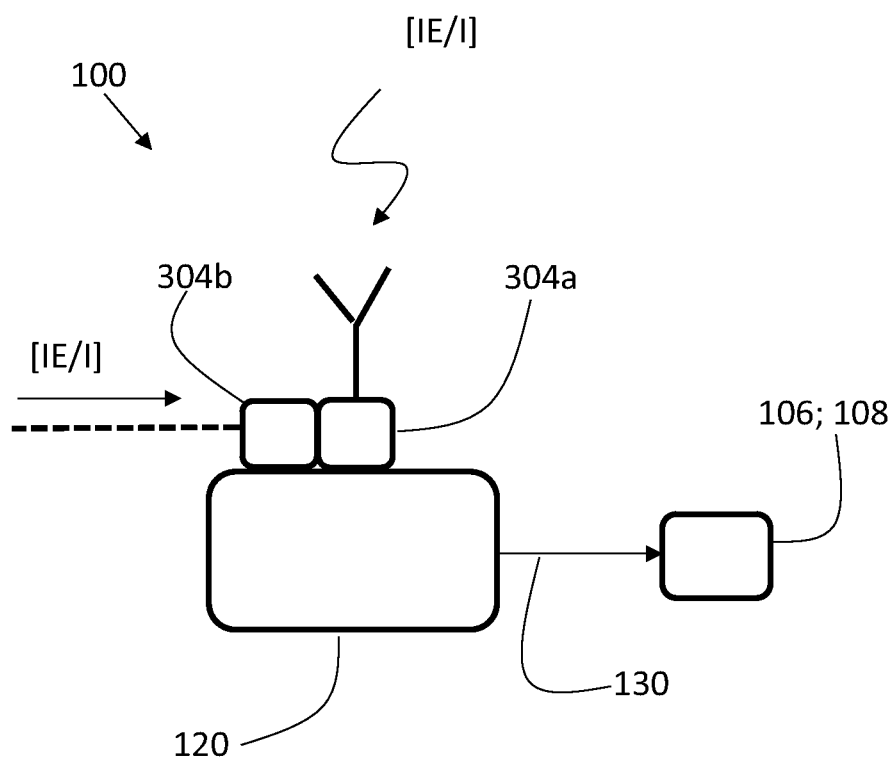
FIG. 11 shows a circuit according to an embodiment of the invention.

According to an embodiment, the controller (C) 120 is arranged to receive at least one information element IE and/or at least one instruction I associated with the at least one electrical load 200n. Some parts of the circuit of the embodiment are shown in FIG. 11, in which the controller (C) 120 is further arranged to control, via the combiner 150, the at least one controllable switch 106; 108 based on any of the at least one information element IE and the at least one instruction I. Therefore, the controller (C) 120 comprises any of wireless receiving means 304a and wired receiving means 304b arranged to receive communication signals comprising an indication of at least one information element IE and/or the at least one instruction I. This instruction I may be an internal primal functioning and/or external incoming instruction e.g. defining a working mode and/or a working constant or variable for the controller (C) 120. The information element IE and/or the instruction I may be transmitted in control signalling of essentially any known communication protocol. For example, 3GPP, WiFi or ITU standards may be used in this respect.

The controller (C) 120 may also be arranged to combine the information element IE and the instruction I with any of monitored power consumption pattern of the at least one electrical load 200n and a determined type of the at least one electrical load for controlling the at least one electrical load.

The controller (C) 120 may further comprise transmitting wired/wireless communication means for transmitting monitored power consumption pattern of the at least one electrical load 200n and/or determined type of the at least one electrical load 200n to other controllers or control devices for further processing.

The controller (C) 120 may be a standalone device such as the one illustrated in FIG. 11, but may in another embodiment be part of a distributed system where e.g. different functions of the controller (C) 120 are located in spatially different locations. For example, the controller (C) 120 may include a master controller (C) and a plurality of slave controllers (not shown in the Figs.). The intelligence may be located in the master controller, which so to speak controls the slave controllers via suitable communication means being wireless and/or wired.

The controller (C) 120 may be a micro controller and may comprise at least one processor for managing the communication and controlling the at least one controllable switch and/or slave controllers. Moreover, it is realized by the skilled person that the present controller (C) 120 may comprise other necessary capabilities in the form of e.g., functions, means, units, elements, etc., for performing the present solution. Examples of other such means, units, elements and functions are: processors, memory, buffers, control logic, transmitters, receivers, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, TCM decoder, power supply units, power feeders, communication interfaces, communication protocols, etc. which are suitably arranged together for performing the present solution.

Especially, the processor or processors of the present controller (C) may comprise, e.g., one or more instances of a Central Processing Unit (CPU), a processing unit, a processing circuit, a processor, an Application Specific Integrated Circuit (ASIC), a microprocessor, a micro controller or other processing logic that may interpret and execute instructions. The expression "processor" may thus represent a processing circuitry comprising a plurality of processing circuits, such as, e.g., any, some or all of the ones mentioned above, or another known processor. The processing circuitry may further perform data processing functions for inputting, outputting, and processing of data comprising data buffering and device control functions, such as call processing control, user interface control, or the like.

Figure 12A:
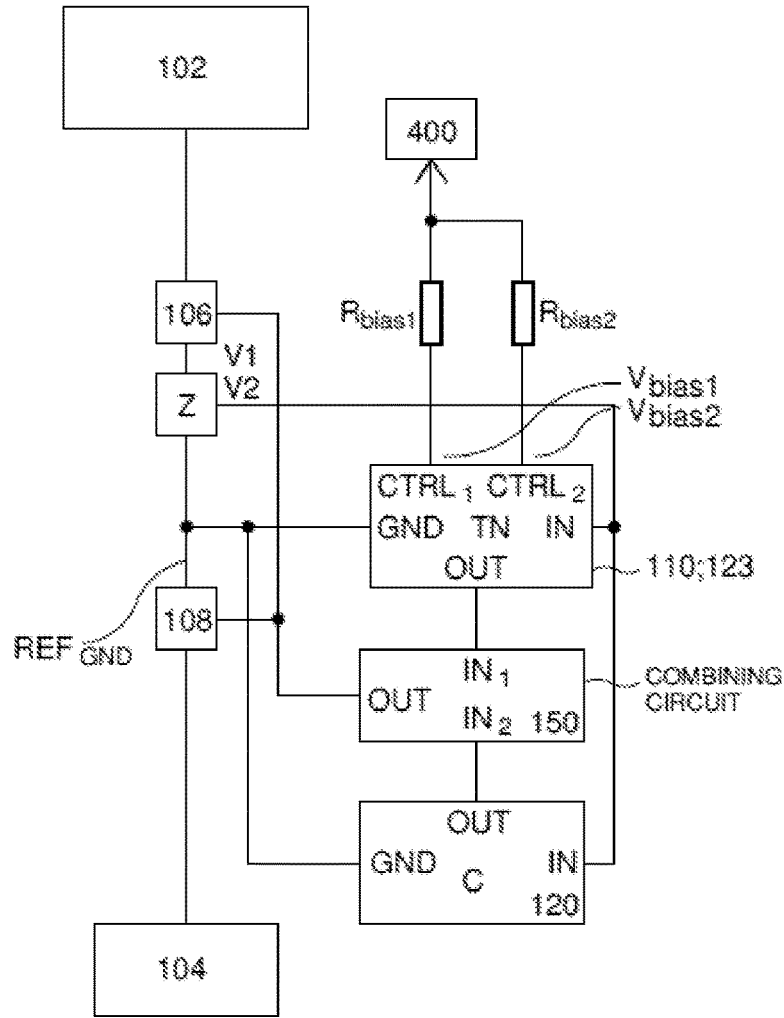
FIGS. 12a-b shows a circuit according to an embodiment of the invention.
Figure 12B:
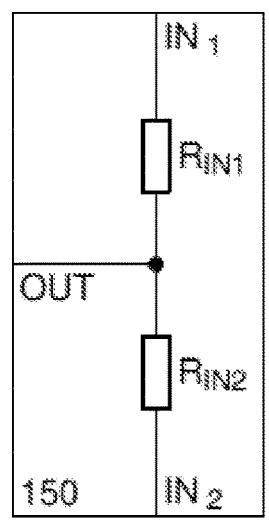

FIGS. 12a-b show a semi-block representation of the circuit 100 shown in FIG. 10, with additional bias voltages $V_{bias1}$; $V_{bias2}$ being provided, as described above e.g. in connection with FIGS. 9a-b. Thus, the circuit 100 in FIG. 12a includes a transistor network (TN) 110 in form of the above described common transistor network block (TN block) 123, a controller (C) 120 coupled to a reference ground $REF_{GND}$ 112 being common to the controller (C) 120 and the at least one controllable switch 106; 108, and a combining circuit 150. The combining circuit 150 is arranged to provide a combined control of the at least one controllable switch 106; 108 based on the value of the at least one voltage V1; V2 by use of the transistor network (TN) 110 and of the controller (C) 120, such that a combined control of the at least one controllable switch 106; 108 is provided. One or more of the at least one transistor $T_{TN1}$; $T_{TN2}$ of the common transistor network block (TN block) 123 are supplied with at least one bias voltage $V_{bias1}$; $V_{bias2}$ from a source of energy 400, as described above. The combining circuit 150 is coupled to both the common transistor network block (TN block) 123 and the controller (C) 120, and is also coupled to the first 106 and second 108 controllable switches. The combining circuit 150 is arranged to provide a combined control of the first 106 and second 108 controllable switches based on the at least one voltage V1; V2. Also, at least one driver circuit 114 may be coupled between the combining circuit 150 and the controllable switches 106, 108 (not shown in FIG. 12a). The driver circuit 114 is, as mentioned above, arranged to amplify control signals used for controlling the switches 106, 108 via the control means 130. For further details of the circuit illustrated in FIG. 12a, reference is made to the above description of the circuit 100 illustrated e.g. in FIG. 10.

FIG. 12b shows the combining circuit 150 more in detail. The combining circuit 150 may, according to an embodiment comprise first $IN_1$ and second $IN_2$ inputs receiving control signals from the transistor network 110 and the controller (C) 120, respectively. The combining circuit 150 may include first Rim and second $R_{IN2}$ resistors coupled in series between the first $IN_1$ and second $IN_2$ inputs, respectively, and an output coupled to a node between the first Rim and second $R_{IN2}$ resistors. Hereby, the combined control signal is provided by the output of the combining circuit 150 to both of the first 106 and second 108 controllable switches, as illustrated in FIG. 12a.

As mentioned above, the impedance network (Z) 140 may also be coupled between the at least one controllable switch 106; 108 and the output 104. Thus, embodiments corresponding to the ones shown in FIGS. 2-12, and described above, but with the impedance network (Z) 140 instead coupled between the at least one controllable switch 106; 108 and the output 104 are also included within the scope of the present invention. These embodiments function correspondingly to what is described above for each respective embodiment shown in FIGS. 2-12, with the difference that the impedance network (Z) is located differently, i.e. between the at least one controllable switch 106; 108 and the output 104.

Figure 13:
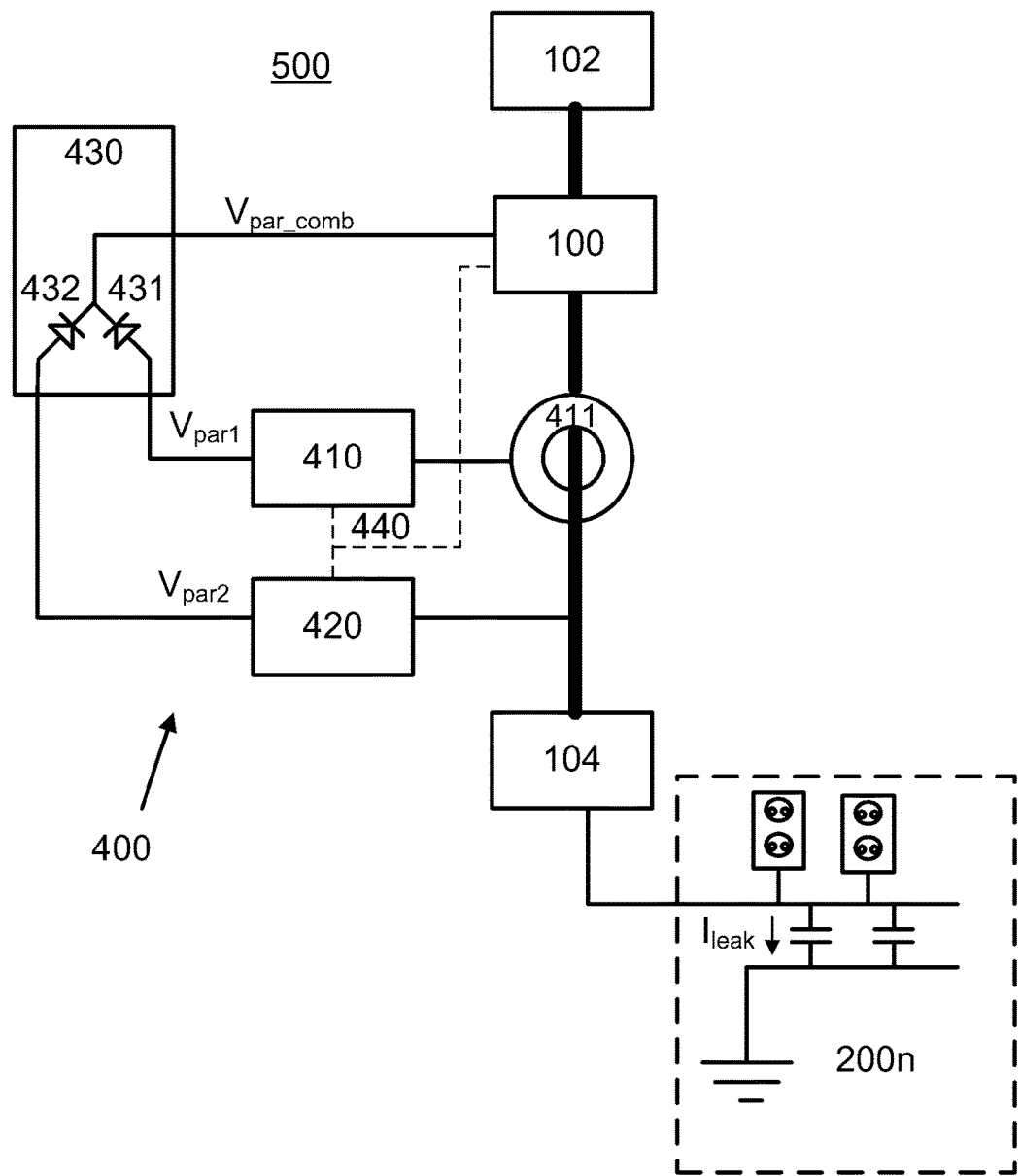
FIG. 13. shows an arrangement according to an embodiment of the invention.

FIG. 13 schematically shows an alternating current AC breaking arrangement 500 according to an aspect of the present invention. The alternating current AC breaking arrangement 500 comprises an input 102, an output 104, and an alternating current breaking circuit 100 according to any of the herein described embodiments. One or more electrical loads 200n are coupled to the output 104. Further, the alternating current AC breaking arrangement 500 comprises a power supply circuit 400 arranged to perform energy harvesting and to provide electrical power for driving the alternating current breaking circuit 100. Basically, the power supply circuit 400 is arranged to extract/draw electrical power from the alternating current AC, and is arranged to then provide the extracted electrical power to a circuit and/or a device in need of a power supply. For example, the alternating current breaking circuit 100 may here be provided with the extracted electrical power in order to drive the components included in the alternating current breaking circuit 100. For example, the controller (C) 120 included in the circuit 100 in some embodiments needs electrical power to run, and the one or more bias voltages $V_{bias1}$, $V_{bias2}$ used in some embodiments may be created by use of electrical power.

As illustrated in FIG. 13, the power supply circuit 400 comprises a first parasite arrangement 410, which may also be denoted the high power load parasite voltage arrangement, being arranged to extract a first parasite voltage $V_{par1}$ from the alternating current (AC). The first parasite arrangement 410 may comprise a transformer 411 arranged to generate the first parasite voltage $V_{par1}$ from the alternating current AC. The transformer 411 may be essentially any kind of magnetic transformer, including e.g. an iron core and at least one coil, suitable for creating the first parasite voltage $V_{par1}$ by use of induction and the magnetic field created around the alternating current. The transformer 411 may be located such that the alternating current runs through its core and/or its primary coil winding. For example, the transformer may be arranged at least partly as a ring formed unit/core/winding placed around a conductor carrying the alternating current AC.

Figure 14A:
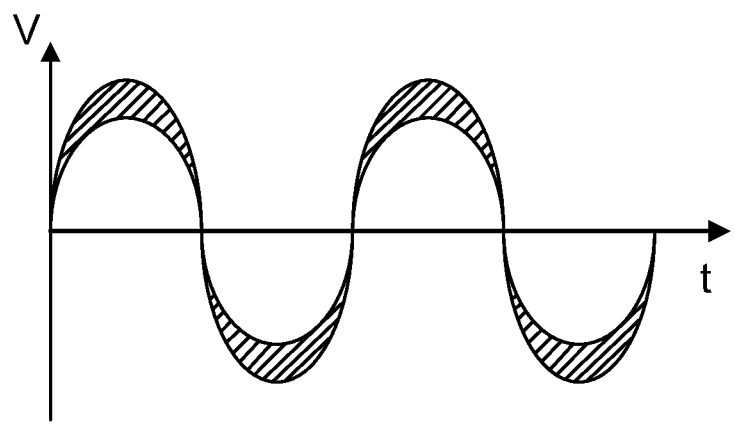
FIGS. 14a-c show some energy harvesting methods.
Figure 14B:
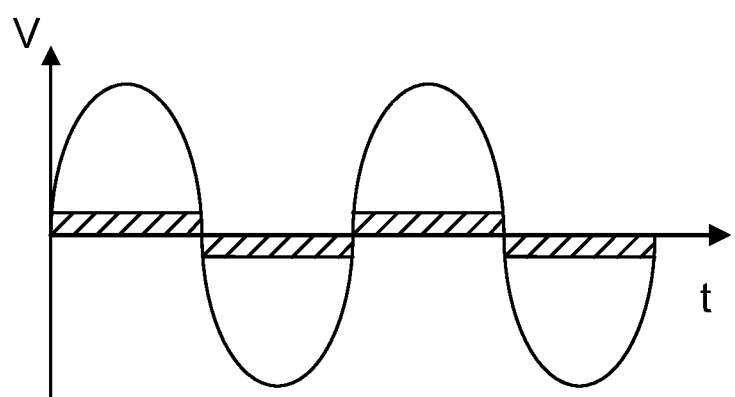
Figure 14C:
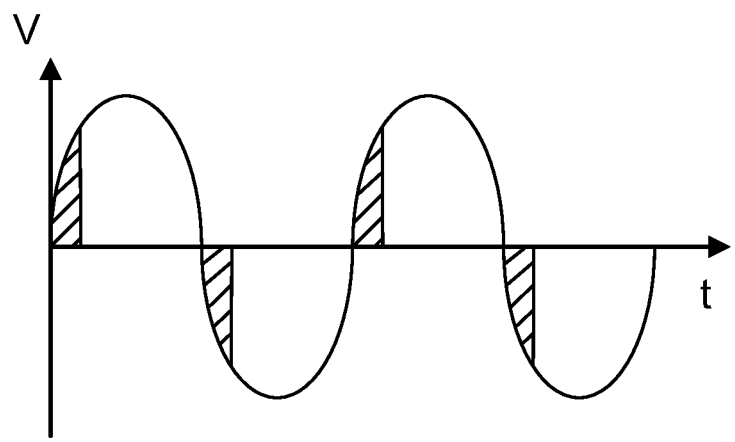

The power supply circuit 400 also comprises a second parasite arrangement 420, which may also be denoted a low power load parasite voltage arrangement, being arranged to extract a second parasite voltage $V_{par2}$ from the alternating current AC. The second parasite arrangement 420 may be arranged to extract a second parasite voltage $V_{par2}$ by extracting a portion of an amplitude of a voltage corresponding to the alternating current AC (as schematically shown in FIGS. 14a-b) and/or by extracting a time duration portion of a cycle of a voltage corresponding to the alternating current AC (as schematically shown in FIG. 14c). In FIGS. 14a-c, the portions extracted from the voltage signals are dashed. There are, as is realised by a skilled person, a number of other methods possible to use for extracting portions of the voltage signals for energy harvesting purposes. The claimed power supply circuit 400 may be configured to extract portions according to one or more of these possible methods.

The power supply circuit 400 also comprises a voltage combiner 430 being arranged to combine the first parasite voltage $V_{par1}$ and the second parasite voltage $V_{par2}$. The voltage combiner 430 may for this reason comprise two rectifying diodes 431; 432 being coupled at their inputs to the first 410 and second 420 parasite arrangements, respectively, to be fed with the first $V_{par1}$ and second $V_{par2}$ parasite voltages. The outputs of the two rectifying diodes 431; 432 are coupled together to form a combined parasite voltage $V_{par\_comb}$, which is provided to the alternating current breaking circuit 100.

According to an embodiment, the first 410 and second 420 parasite arrangements may be arranged to communicate 440 in simplex or duplex mode with each other, such that one of the first 410 and second 420 parasite arrangements is regarded as a master unit, arranged for controlling the other one of the first 410 and second 420 parasite arrangements, which is then regarded as a slave unit. Also, information may be communicated 440 to the controller (C) 120 of the alternating current breaking circuit 100. The information provided to the controller (C) 120 may include e.g. power consumption and/or load information. The controller (C) 120 may then use this information to switch between active and standby modes for the controller (C) 120.

The combined use of the first 410 and second 420 parasite arrangements is very advantageous, since they complement each other very well. The first parasite arrangement 410 works well for higher power, i.e. for stronger AC currents, since the transformer 411 is well suited to create the first parasite voltage $V_{par1}$ during strong currents. The second parasite arrangement 420, however, works poorly for strong currents, since the voltage extraction methods used by the second parasite arrangement 420 may cause heating of the second parasite arrangement 420 and/or may cause current/voltage transients and/or steps that need to be filtered. Filtering of such strong currents today demands for a bulky filter, which normally does not fit into an alternating current breaker. The second parasite arrangement 420 works well for lower power, i.e. for weaker AC currents. The first parasite arrangement 410, on the other hand, can often not extract a useful voltage from the alternating current AC if the current is not strong enough.

According to an embodiment, the first parasite arrangement 410 is used mainly for extracting the first parasite voltage $V_{par1}$ during stronger current time periods, and the second parasite arrangement 420 is used mainly for extracting the second parasite voltage $V_{par2}$ during weaker current time periods. Thus, when these two extracting methods are combined, as is performed according to the embodiment, a reliable and useful combined parasite voltage $V_{par\_comb}$ may be provided as a power supply to the alternating current AC breaking circuit 100 during essentially any condition when the one or more loads 200n consume power.

Since the first $V_{par1}$ and second $V_{par2}$ parasite voltages are extracted from the alternating current AC in series with the one or more loads, the power supply circuit 400 will always be able to provide power to the alternating current breaking circuit 100 when current is provided to the one or more active loads. Also, when the one or more loads are inactive, a leakage current $I_{leak}$ still runs to the ground/earth at the loads, which often is enough for creating at least the first $V_{par1}$ parasite voltage. Thus, a reliable and useful combined parasite voltage $V_{par\_comb}$ may be provided as a power supply to the alternating current AC breaking circuit 100 during essentially any condition, also when the one or more loads 200n do not consume power.

Further applications of the present invention may relate to power consumption of the at least one electrical load and the controlling of the at least one electrical load.

The invention claimed is:

1. A circuit for breaking alternating current, the circuit comprising:
   an input arranged to receive an alternating current; an output arranged to provide the alternating current to at least one electrical load;

a first controllable switch and a second controllable switch coupled in series with each other and being arranged between the input and the output;
an impedance network coupled between the first controllable switch and the second controllable switch, wherein the impedance network comprises a limiting/delay circuit coupled between the first controllable switch and the second controllable switch; and
a transistor network comprising at least one transistor, the transistor network being arranged to control the first controllable switch and the second controllable switch, so as to control the breaking of the alternating current provided to the at least one electrical load, based on a value of at least one voltage of at least one node of the impedance network.

2. The circuit according to claim 1, wherein the first controllable switch and the second controllable switch are coupled in opposite directions between the input and the output.

3. The circuit according to claim 1, wherein the first controllable switch and the second controllable switch are Field Effect Transistors (FETs).

4. The circuit according to claim 1, wherein the transistor network is further arranged to control the first controllable switch and the second controllable switch based on at least one of a first voltage of a first node of the impedance network and a second voltage of a second node of the impedance network.

5. The circuit according to claim 4, wherein the second voltage is a difference voltage between the second node and a reference ground, the reference ground being different from at least one reference voltage for the at least one electrical load.

6. The circuit according to claim 4, wherein the first voltage is a difference voltage between the first node and a reference ground, the reference ground being different from a reference voltage for the at least one electrical load.

7. The circuit according to claim 1, further comprising:
a combining circuit; and
a controller coupled to a reference ground common to the controller and the first controllable switch and the second controllable switch, and arranged to measure the at least one voltage of the at least one node of the impedance network;
wherein the combining circuit is arranged to provide a combined control of the first controllable switch and the second controllable switch based on the value of the at least one voltage by use of the transistor network and of the controller.

8. The circuit according to claim 7, wherein the controller is further arranged to control the first controllable switch and the second controllable switch such that breaking of the alternating current is triggered for a lower power consumption of the at least one electrical load than a power consumption that would trigger breaking of the alternating current when the first controllable switch and the second controllable switch are controlled by the transistor network alone.

9. The circuit according to claim 7, wherein the controller is further arranged to:
monitor a power consumption pattern of the at least one electrical load; and
control the first controllable switch and the second controllable switch based on the monitored power consumption pattern of the at least one electrical load.

10. The circuit according to claim 9, wherein the controller is further arranged to control the first controllable switch and the second controllable switch such that breaking of the alternating current is effected if the power consumption pattern is irrational.

11. The circuit according to claim 9, wherein the controller is further arranged to determine the type of the at least one electrical load based on the monitored power consumption pattern.

12. The circuit according to claim 11, wherein the controller is further arranged to control the first controllable switch and the second controllable switch based on the determined type.

13. The circuit according to claim 7, wherein the controller is further arranged to:
receive one or more of at least one information element and at least one instruction associated with the at least one electrical load; and
control the first controllable switch and the second controllable switch based on one or more of the at least one information element and the at least one instruction.

14. The circuit according to claim 13, wherein the controller comprises any of wireless receiving means and wired receiving means arranged to receive communication signals comprising an indication of at least any of the at least one information element and the at least one instruction element.

15. The circuit according to claim 1, wherein the transistor network is an autonomous network arranged to control the first controllable switch and the second controllable switch based only on the at least one voltage.

16. The circuit according to claim 1, wherein the transistor network is arranged to control the first controllable switch and the second controllable switch based on at least one voltage comparison.

17. The circuit according to claim 1, wherein one or more of the at least one transistor comprised in the transistor network are supplied with at least one bias voltage.

18. The circuit according to claim 1, wherein the transistor network comprises at least one resistor coupled in series to a controlling input of the at least one transistor, the at least one resistor having a resistance such that the at least one transistor is protected, and a time period during which the at least one transistor operates in its linear region is reduced.

19. An alternating current breaking arrangement comprising:
the alternating current breaking circuit according to claim 1, and
a power supply circuit arranged to provide electrical power for driving the alternating current breaking circuit, the power supply circuit comprising:
a first parasite arrangement arranged to extract a first parasite voltage from the alternating current;
a second parasite arrangement arranged to extract a second parasite voltage from the alternating current; and
a voltage combiner arranged to combine the first parasite voltage and the second parasite voltage.

20. The alternating current breaking arrangement according to claim 19, wherein the first parasite arrangement comprises a transformer arranged to generate the first parasite voltage from the alternating current.

21. The alternating current breaking arrangement according to claim 19, wherein the second parasite arrangement is arranged to extract a second parasite voltage by one or more in the group of:
extracting a portion of an amplitude of a voltage corresponding to the alternating current; and
extracting a time duration portion of a cycle of a voltage corresponding to the alternating current.

22. The alternating current breaking arrangement according to claim 19, wherein the voltage combiner comprises two rectifying diodes.

\* \* \* \* \*